United States Patent Office 3,780,048
Patented Dec. 18, 1973

3,780,048
1-HYDROXY-2-(SUBSTITUTED ANILINO) QUINOLIZINIUM BROMIDES
Robert J. Alaimo and Marvin M. Goldenberg, Norwich, N.Y., assignors to Morton-Norwich Products, Inc.
No Drawing. Filed July 12, 1972, Ser. No. 270,960
Int. Cl. A61k 27/00; C07d 39/12
U.S. Cl. 260—296 B                7 Claims

ABSTRACT OF THE DISCLOSURE 1-hydroxy-2-(substituted anilino)quinolizinium bromides are useful as anti-inflammatory agents.

---

This invention relates to 1-hydroxy-2-(substituted anilino)quinolizinium compounds particularly those of the formula:

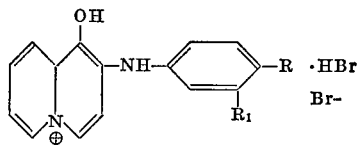

wherein R is methoxy, ethoxy, phenoxy or allyloxy and $R_1$ is hydrogen or methoxy.

These compounds are anti-inflammatory agents. When administered perorally to rats in an aqueous suspension followed by the subplantar injection of 0.05 ml. of a 1% solution of carrageen (Viscarin®) into the hindfoot of said rats, they cause a marked reduction in edema. This useful anti-inflammatory effect in a standardized test for detecting such property makes them desirable agents in counteracting inflammation.

The method for preparing the compounds of this invention which is presently preferred consists in reacting 1-acetoxy-2-bromoquinolizinium bromide with the appropriate aniline in a suitable solvent such as isopropanol and advantageously under the influence of heat.

In order that this invention may be readily understood by and available to those skilled in the art, the following examples are set forth.

EXAMPLE I 1-hydroxy-2-(p-phenetidino)quinolizinium bromide hydrobromide

To a solution of 1-acetoxy-2-bromoquinolizinium bromide (30.0 g., 0.09 mole) in isopropanol (600 ml.) was added p-phenetidin (24.0 g., 0.18 mole). The stirred mixture was boiled under reflux for 4 hours, during which time solid had precipitated from solution. The cooled mixture was filtered and washed with ether. The product as yellow needles weighed 37.0 g. (97%). Recrystallization from alcohol-ether provided yellow needles which melted at 161–162°.

Analysis.—Calcd. for $C_{17}H_{17}BrN_2O_2 \cdot HBr$ (percent): C, 46.18; H, 4.10; N, 6.34; Br, 36.15. Found (percent): C, 46.20; H, 4.30; N, 6.42; Br, 35.92, 35.85.

EXAMPLE II 2-(p-anisidino)-1-hydroxyquinolizinium bromide hydrobromide

Into a 500 ml., 3-neck flask was placed a mixture of 1-acetoxy-2-bromoquinolizinium bromide (12.0 g., 0.035 mole), p-anisidine (9.6 g., 0.078 mole) and isopropanol (240 ml.). The stirred solution was boiled under reflux for 4.5 hours. After cooling in an ice bath the reaction mixture was treated with ethyl acetate to induce crystallization. The yellow solid (11.0 g., 74%) was removed by filtration, washed with ether and ethyl acetate and dried at 63°. Recrystallization from isopropanol/ethyl acetate provided a pale yellow powder which melted at 129–133°.

Analysis.—Calcd. for $C_{16}H_{15}BrN_2O_2 \cdot HBr$ (percent): C, 44.88; H, 3.77; N, 6.54; Br, 37.33. Found (percent): C, 44.70, 44.74; H, 3.70, 3.83; N, 6.57, 6.63; Br, 37.16, 37.07.

EXAMPLE III 1-hydroxy-2-(p-phenoxyanilino)quinolizinium bromide hydrobromide To a solution of 1-acetoxy-2-bromoquinolizinium bromide (12.0 g., 0.035 mole) in isopropanol (250 ml.) was added p-phenoxyaniline (15.0 g., 0.08 mole). The stirred mixture was boiled under reflux for 3.5 hours. The reaction mixture was treated with ether and scratched, and the precipitate was removed by filtration and dried at 63°. The mustard-yellow product weighed 11.0 g. (65%). Recrystallization from isopropanol/ether provided gold crystals melting at 123–125°.

Analysis.—Calcd. for $C_{21}H_{17}BrN_2O_2 \cdot HBr$ (percent): C, 51.45; H, 3.70; N, 5.72; Br, 32.61. Found (percent): C, 51.52, 51.42; H, 3.69, 3.74; N, 5.65, 5.72; Br, 32.70, 32.77.

EXAMPLE IV 2-(p-allyloxyanilino)-1-hydroxyquinolizinium bromide hydrobromide To a solution of 1-acetoxy-2-bromoquinolizinium bromide (10.0 g., 0.029 mole) in isopropanol (200 ml.) was added p-allyloxyaniline (11.0 g., 0.068 mole). The stirred mixture was boiled under reflux for 4.5 hours. The reaction mixture was cooled at room temperature overnight, and the solid was removed by filtration and washed with ether, providing 5.0 g. of product. The supernatant solution was treated with ether and refrigerated, providing another 5.0 g. of product, making the total yield 10.0 g. (77%). Recrystallization from isopropanol produced a light yellow powder melting at 125–127°.

Analysis.—Calcd. for $C_{18}H_{17}BrN_2O_2 \cdot HBr$ (percent): C, 47.60; H, 3.99; N, 6.17; Br, 35.19. Found (percent): C, 47.69, 47.70; H, 4.09, 4.17; N, 6.12, 6.15; Br, 34.41, 34.26.

EXAMPLE V 1-hydroxy-2-(3,4-dimethoxyanilino)quinolizinium bromide hydrobromide To a solution of 1-acetoxy-2-bromoquinolizinium bromide (10.0 g., 0.029 mole) in isopropanol (200 ml.) was added 4-aminoveratrole (10.0 g., 0.65 mole). The stirred mixture was boiled under reflux for 4.5 hours. The reaction mixture was cooled overnight at room temperatures, and the solid was then removed by filtration. The green product was suspended in ether and filtered again. It weighed 10.0 g. after having dried at 63°. Recrystallization from alcohol provided a light green analytical sample melting at 160–162°.

Analysis.—Calcd. for $C_{17}H_{17}BrN_2O_3 \cdot HBr$ (percent): C, 44.56; H, 3.96; N, 6.12; Br, 34.89. Found (percent): C, 44.80, 44.56; H, 4.01, 4.05; N, 5.96, 5.96; Br, 34.88, 34.73.

What is claimed is:
1. A compound of the formula:

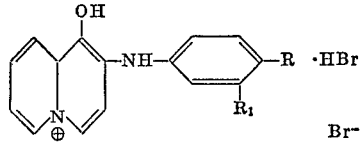

wherein R is methoxy, ethoxy, phenoxy or allyloxy and $R_1$ is hydrogen or methoxy.

2. The compound of claim 1 wherein R is methoxy and $R_1$ is hydrogen.

3. The compound of claim 1 wherein R is ethoxy and $R_1$ is hydrogen.

4. The compound of claim 1 wherein R is phenoxy and $R_1$ is hydrogen.

5. The compound of claim 1 wherein R is allyloxy and $R_1$ is hydrogen.

6. The compound of claim 1 wherein R is methoxy and $R_1$ is methoxy.

7. The method of preparing a compound of the formula:

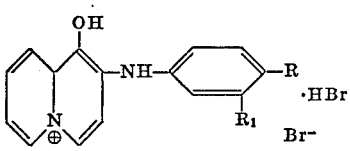

wherein R is methoxy, ethoxy, phenoxy or allyloxy and $R_1$ is hydrogen or methoxy which comprises reacting 1-acetoxy-2-bromoquinolizinium bromide with an aniline of the formula:

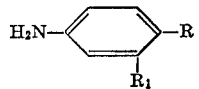

wherein R and $R_1$ have the aforeassigned significance.

References Cited
UNITED STATES PATENTS
3,517,019   6/1970   Alaimo _____ 260—294.8

HENRY R. JILES, Primary Examiner
C. M. S. JAISLE, Assistant Examiner

U.S. Cl. X.R.
424—263

UNITED STATES PATENT OFFICE
CERTIFICATE OF CORRECTION

Patent No. 3,780,048     Dated December 18, 1973

Inventor(s) Robert J. Alaimo and Marvin M. Goldenberg

It is certified that error appears in the above-identified patent and that said Letters Patent are hereby corrected as shown below:

Formula at column 1, lines 17-24 should appear as follows:

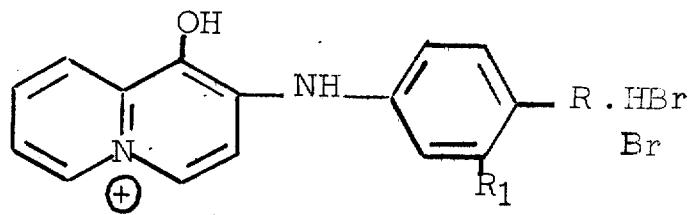

also, the formula in Claim 1 should appear as:

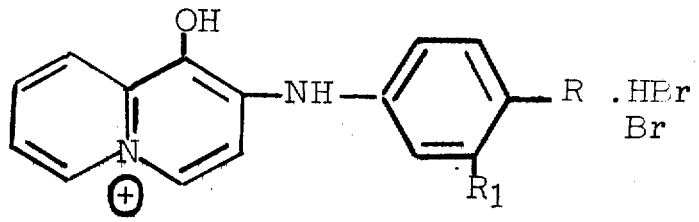

Signed and sealed this 16th day of July 1974.

(SEAL)
Attest:

McCOY M. GIBSON, JR.
Attesting Officer

C. MARSHALL DANN
Commissioner of Patents